United States Patent Office 2,713,567
Patented July 19, 1955

2,713,567

COMPOSITION CONTAINING GLYCIDYL POLYETHER AND A POLYVINYL ACETAL RESIN

James R. Scheibli, San Lorenzo, Calif., assignor to Shell Development Company, Emeryville, Calif., a corporation of Delaware No Drawing. Application April 14, 1952,
Serial No. 282,263

7 Claims. (Cl. 260—45.5)

This invention relates to a composition of matter which is particularly useful in applications as a surface coating material and also in adhesive formulations.

Glycidyl polyethers of dihydric phenols with a 1,2-epoxy equivalency between 1.0 and 2.0 have been employed heretofore in protective coating uses wherein a solution of the polyether in admixture with a curing agent is applied as a film to a surface desired to be protected and the solvent is evaporated with curing of the polyether to a tough protective coating. Although excellent protective films are obtained in this manner, application of the glycidyl polyether to surfaces so that a relatively thick cured film of about 5 mils thickness is obtained in a single application is not wholly satisfactory because of tendency of the curing film to crawl. Crawling of a film is the development of regions of more pronounced thickness during the drying and curing. The crawling occurs even though the film of coating material initially applied is of uniform thickness. During the drying and cure, the resin-forming material moves or crawls so that when it sets and solidifies by resinification, areas of the resulting film are lacking in uniform thickness. For reasons of economy, it is very desirable that surface coating material be applied in as thick a coat as possible rather than applying a plurality of thin coats. However, it is necessary that the thick cured film be of uniform thickness so as to be smooth. It is, therefore, of prime importance that crawling of film-forming material be prevented.

It has now been discovered that incorporation of a polyvinyl acetal resin with glycidyl polyether of a polyhydric phenol having a 1,2-epoxy equivalency greater than 1.0 is very effective in preventing crawling of curing films thereof. My invention is, therefore, a composition comprising glycidyl polyether of a polyhydric phenol with a 1,2-epoxy equivalency greater than 1.0, having admixed therewith a polyvinyl acetal resin which is preferably, but not necessarily, present in minor proportion.

The composition of the invention, besides giving surface coating films which do not crawl, was also found to be very useful in adhesive formulations because of the discovery that the bond obtained with the cured resin, especially in joining metal to metal, has unusually high resistance to mechanical shock, i. e., the impact strength is very great.

The glycidyl polyethers employed in the invention are obtainable from reaction of epichlorhydrin and polyhydric phenols in an alkaline medium. They can be glycidyl polyether of a polyhydric phenol, including pyrogallol and phloroglucinol, but glycidyl polyethers of a dihydric phenol are particularly suited. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

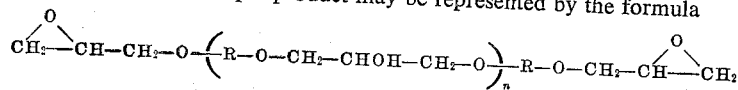

wherein $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidal radicals in hydrated form.

The simplest of such polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The glycidyl polyethers used in the invention have a 1,2-epoxy equivalency greater than 1.0. By the epoxy equivalency reference is made to the average number of 1,2-epoxy groups

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2 even when derived from a dihydric phenol. However, in all cases it is a value greater than 1.0. The 1,2-epoxy equivalency of the polyethers of dihydric compounds is a value between 1.0 and 2.0.

The 1,2-epoxide value of the glycidyl polyether is determined by heating a weighed sample of the ether with an excess of 0.2 N pyridinium chloride in chloroform solution at the boiling point under reflux for two hours whereby the pyridinium chloride hydrochlorinates the epoxy groups to chlorhydrin groups. After cooling, the excess pyridinium chloride is back-titrated with 0.1 N sodium hydroxide in methanol to the phenolphthalein end point. This method is used for obtaining all epoxide values discussed herein.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4' - dihydroxybenzophenone, bis(4-hydroxyphenyl)-methane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2-methylphenyl)propane, 2,2-bis(4-hydroxy - 2 - tertiary-butylphenyl)-propane, 2,2-bis(2-hydroxynaphthyl)pentane, 1,5 - dihydroxynaphthalene, etc.

Preferred polyethers are prepared from 2,2-bis(4-hydroxyphenyl)propane. They contain a chain of alternating glyceryl and 2,2-bis(4-phenylene)propane radicals separated by intervening ethereal oxygen atoms and have a 1,2-epoxy equivalency between 1.0 and 2.0, and a molecular weight of about 500 to 1000.

The glycidyl polyethers will be more fully understood from consideration of the following described preparations and the properties of the products.

POLYETHER A

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1,880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' Mercury Method softening point of 9° C., an average molecular weight of 370 by ebullioscopic measurement in ethylene dichloride, and an epoxide value of 0.50 epoxy equivalents per 100 grams. It has a 1,2-epoxy equivalency of 1.85. The product is designated herein as Polyether A.

POLYETHER B

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes have elapsed, there is added during an additional 15 minutes' time a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooling rapidly. At room temperature, the product is an extremely viscous, semi-solid having a softening point of 27° C. by Durrans' Mercury Method, and a molecular weight of 460. The 1,2-epoxy equivalency is 1.88. This product will be referred to hereinafter as Polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 86 parts (2.14 mols) sodium hydroxide as a 10% aqueous solution are introduced and heated to about 45° C. whereupon 188 parts (2.04 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 43° C. The measured molecular weight of the product is 520 and it has an epoxide value of 0.29 epoxy equivalents per 100 grams. The 1,2-epoxy equivalency is 1.8. It will be identified hereinafter as Polyether C.

POLYETHER D

This glycidyl polyether is prepared in like manner to that of Polyether C except that for each mol of bis-phenol there are employed 1.57 mols of epichlorhydrin and 1.88 mols of sodium hydroxide. The glycidyl polyether product has a Durrans' Mercury Method softening point of 70° C., a molecular weight of 900 as measured ebullioscopically in ethylene dichloride, and an epoxide value of 0.20 epoxy equivalents per 100 grams. The 1,2-epoxy equivalency is 1.8.

POLYETHER E

This glycidyl polyether is also prepared in like manner to that of Polyether C except that for each mol of bis-phenol there are employed 1.22 mols of epichlorhydrin and 1.37 mols of sodium hydroxide. The resulting polyether has a softening point of 98° C. by Durrans' Mercury Method, a molecular weight of 1400 as measured ebullioscopically in ethylene dichloride, and an epoxide value of 0.11 epoxy equivalents per 100 grams. The 1,2-epoxy equivalency is 1.54.

POLYETHER F

Glycidyl polyethers of still higher molecular weight are most easily prepared by heating together and reacting a lower polyether with additional dihydric phenol. One hundred parts of Polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxide value of 0.05 epoxy equivalents per 100 grams, and a 1,2-epoxy equivalency of 1.45.

The other essential ingredient of the composition of my invention is a polyvinyl acetal resin. The polyvinyl acetal resins are well known substances that need little explanation. They are acetals from reaction of an aldehyde and polyvinyl alcohol, which alcohol is normally derived from polyvinyl acetate. Many polyvinyl acetal resins are commercially available. Thus a resin sold under the name of Alvar 5/80 is a product derived from polyvinyl acetate made by replacing 80% of the acetyl groups by acetal groups from acetaldehyde, the original polyvinyl acetate being a substance which gives a benzene solution of 86 grams per liter having a viscosity of 5 centipoises at 20° C. Similarly, the resin known as Alvar 7/70 is derived from polyvinyl acetate giving a benzene solution of 86 grams per liter having a viscosity of 7 centipoises at 20° C., which resin has 70% of the acetyl groups replaced by acetal groups from acetaldehyde.

In order to avoid ambiguity in terminology of the acetal resins, certain defining terms will be used in this specification and the claims. The term "a polyvinyl acetal resin" will be employed generically to designate the acetal resin contained in the composition of the invention, and the sub-generic term "a polyvinyl acetal resin of alkanal of 1 to 4 carbon atoms" will be used to designate the resins derived from the saturated aldehydes formaldehyde through butraldehyde. Specific polyvinyl acetal resins will use names without inclusion of the word "resin" as is the case with polyvinyl formal from formaldehyde, polyvinyl acetal from acetaldehyde, and polyvinyl butyral from butyraldehyde.

Any polyvinyl acetal resin can be used in the composition of the invention although it is preferred that the material be a polyvinyl acetal resin of an alkanal of 1 to 4 carbon atoms. It is also preferred that the resin be derived from polyvinyl acetate with from 50% to 100% of the acetyl groups replaced with alkanal groups (alkylidene groups) of an alkanal of 1 to 4 carbon atoms, which polyvinyl acetal resin has a molecular weight of about 20,000 to 100,000. In all cases, the polyvinyl acetal resins are thermoplastic materials.

The composition of the invention is prepared by mixing the polyvinyl acetal resin with the glycidyl polyether. If the glycidyl polyether is a solid at ordinary temperature, the polyvinyl acetal can be incorporated therewith by heating and melting the polyether, and then adding the polyvinyl acetal resin with thorough mixing of the composition.

Since one of the principal uses of the composition is as a surface coating material, it is convenient to prepare the composition in volatile solvents which evaporate upon application of the solution to a surface. For such uses, a solution of the polyvinyl acetal resin in organic solvent is mixed and stirred into a solution of the glycidyl polyether. If desired, the polyvinyl acetal resin can be merely added to a solution of the glycidyl polyether in organic solvents. Various volatile organic compounds are suitable as solvents including ketones such as acetone, methyl ethyl ketone, methyl isobutyl ketone, diacetone alcohol, isophorone, etc.; esters such as ethyl acetate, butyl acetate, the acetate of mono-ethyl ether of ethylene glycol, etc.; ether alcohols such as methyl, ethyl or butyl ether of ethylene glycol or diethylene glycol, etc.; or highly halogenated hydrocarbons such as trichloropropane, chloroform, etc. Combinations of compounds are very useful such as mixtures of an aromatic hydrocarbon such as toluene or xylene with a ketone, an ester or a lower alcohol such as ethanol, isopropanol or n-butanol in a weight ratio of about 3:1 to 1:3, equal weight ratio being particularly suited. When employed in solutions, the solutions normally contain about 25% to 60% by weight of the composition.

Various amounts or proportions of the polyvinyl acetal resin are used with the glycidyl polyether in the composition of the invention. Normally the polyvinyl acetal resin is present in minor proportion. When the acetal resin is used for the purpose of preventing crawling, about an added 1% to 10% polyvinyl acetal resin based upon the amount of glycidyl polyether is employed. Like proportions are effective in giving high impact strength to cured compositions employed for adhesive purposes.

Depending largely upon the particular purpose for which the composition is used, it can also contain other constituents such as dyes, pigments, other resins, plasticizers, fillers, etc.

The composition is cured by adding a curing agent with or without application of heat. Elevated temperature such as about 50° C. to 200° C. shortens the length of time to complete the cure to a hard tough resinous product. Various acidic and basic curing agents are employed to effect the cure including amines such as ethylene diamine, diethylene triamine, dibutylamine, piperidine, N,N-diethyl-1,3-propanediamine, etc.; and acids such as phosphoric acid, butyl dihydrogen phosphate, oxalic acid, phthalic anhydride, benzenedisulfonic acid, etc. The curing agents are used in amounts of about 1% to 10% based upon the weight of glycidyl polyether contained in the composition.

The following examples are given for the purpose of illustrating the invention and the advantages thereof. The parts and percentages are by weight.

*Example 1*

A solution containing 50% solids was prepared by dissolving 97 parts of Polyether C and 3 parts of polyvinyl acetal (Alvar 5/80) in a mixture of 75% toluene and 25% n-butanol.

A second solution was prepared containing 50% solids by dissolving 95 parts of Polyether C and 5 parts of polyvinyl acetal (Alvar 7/70) in a mixture of 70% toluene and 30% n-butanol.

A third solution as control containing 50% solids was prepared by dissolving 100 parts of Polyether C in a mixture of 75% toluene and 25% n-butanol.

To each solution, about 6 parts of ethylenediamine as curing agent were added with thorough mixing and the mixtures were spread on plate glass panels with a 10 mil doctor blade. The coated panels were dried at room temperature of 25° C. and the films allowed to cure at this temperature. The films were set to touch in about 45 minutes' time. After curing fully, the films were examined.

It was found that the films from the compositions containing the polyvinyl acetal resins were smooth, hard and tough. These films of about 5 mils thickness were free of crawling. The film from the third solution containing no polyvinyl acetal resin was also of an average thickness of about 5 mils, but showed pronounced crawling and was not smooth.

*Example 2*

Solutions were prepared containing about 50% film-forming solids in a solvent mixture of 75% toluene and 25% n-butanol. In one solution, the solids consisted of 95 parts of Polyether D and 5 parts of polyvinyl acetal (Alvar 5/80) while the other contained 100 parts of Polyether D alone. About 4 parts of ethylenediamine as curing agent were mixed with each solution and the mixtures were spread on plate glass panels with the 10 mil doctor blade. The coated panels were dried and the films allowed to cure at room temperature of 25° C. Inspection of the two cured films showed that from the composition containing the polyvinyl acetal resin to be smooth, free from crawling and of a thickness of about 5 mils while the film from the composition containing no polyvinyl acetal resin displayed crawling and was not smooth.

Example 3

A series of compositions were prepared containing equal parts of glycidyl polyether (Polyether A, E or F) and polyvinyl acetal resins which were polyvinyl formal (Formvar) or polyvinyl butvar. The solutions contained 10 parts of the polyether and 10 parts of the polyvinyl acetal resin dissolved in 45 parts of ethylene dichloride, 45 parts of diacetone alcohol, 5 parts of xylene and 10 parts of the acetate of the mono-ethyl ether of ethylene glycol. The compositions were spread on plate glass with films being obtained by baking for 30 minutes in an oven at 200° C. The films were inspected for crawling with the following results.

| Glycidyl Polyether | Acetal Resin | Crawling |
|---|---|---|
| Polyether A | Polyvinyl formal | None. |
| Polyether E | do | Do. |
| Polyether F | do | Do. |
| Polyether A | Polyvinyl butyral | Do. |
| Polyether E | do | Do. |
| Polyether F | do | Do. |

Example 4

It was discovered that incorporation of a polyvinyl acetal resin in adhesive formulations containing glycidyl polyether of a polyhydric alcohol for use in bonding metal to metal greatly improves the resistance of the cured resin bond to mechanical shock, i. e., the bond has much improved impact strength.

An adhesive formulation was prepared having the composition containing 7.5 parts of polyvinyl acetal (Alvar 5/80) and 85 parts of Polyether B mixed with 15 parts of allyl glycidyl ether as reactive fluidizing agent. A control formulation was prepared by mixing 15 parts of allyl glycidyl ether with 85 parts of Polyether B. To each formulation were added 8 parts of N,N-diethyl-1.3-propanediamine as curing agent. The adhesive properties of the mixtures were tested with clean aluminum blocks of about one-quarter inch thickness. The freshly prepared adhesive mixtures were spread on a one inch square surface of each of two blocks with the aid of a 5 mil doctor blade and the coated surfaces of the two blocks were united. The joined blocks were placed in an oven for 2 hours at 200° F. to resinify and cure the bond. The Izod impact strength was determined according to ASTM method D950–47T. It was found that the blocks bonded with the formulation containing no polyvinyl acetal resin had an impact strength of 0.7 foot-pounds per square inch. The blocks bonded with the formulation containing the polyvinyl acetal resin had an impact strength greater than the limit of the testing machine and amounted to more than 15 foot-pounds per square inch. Other blocks bonded with the formulation containing polyvinyl acetal resin were tested for shear strength which was found to be 2380 pounds per square inch at 25° C.

I claim as my invention:

1. A composition of matter which comprises a homogeneous mixture of (1) a glycidyl polyether of a polyhydric phenol having a 1,2-epoxy equivalency greater than 1.0, and (2) a polyvinyl acetal resin.

2. A composition comprising a homogeneous mixture of (1) a glycidyl polyether of a dihydric phenol having a 1,2-epoxy equivalency between 1.0 and 2.0, and (2) a minor amount of a polyvinyl acetal resin of an alkanal of 1 to 4 carbon atoms.

3. A composition comprising a homogeneous mixture of (1) a glycidyl polyether of a 2,2-bis(4-hydroxyphenyl)propane having a 1,2-epoxy equivalency between 1.0 and 2.0, and (2) a minor amount of a polyvinyl acetal resin of an alkanal of 1 to 4 carbon atoms.

4. A composition comprising a homogeneous mixture of (1) a glycidyl polyether of 2,2-bis(4-hydroxyphenyl)propane having a 1,2-epoxy equivalency between 1.0 and 2.0, and a molecular weight of about 500 to 1000, and (2) 1% to 10% by weight of a polyvinyl acetal resin of an alkanal of 1 to 4 carbon atoms, which acetal resin has a molecular weight of about 20,000 to 100,000.

5. A composition comprising a homogeneous mixture of (1) a glycidyl polyether of 2,2-bis(4-hydroxyphenyl)propane having a 1,2-epoxy equivalency of between 1.0 and 2.0, and a molecular weight of about 500 to 1000, and (2) 1% to 10% by weight of polyvinyl acetal.

6. A composition comprising a homogeneous mixture of (1) a glycidyl polyether of 2,2-bis(4-hydroxyphenyl)propane having a 1,2-epoxy equivalency of between 1.0 and 2.0, and a molecular weight of about 500 to 1000, and (2) 1% to 10% by weight of polyvinyl formal.

7. A composition comprising a homogeneous mixture of (1) a glycidyl polyether of 2,2-bis(4-hydroxyphenyl)propane having a 1,2-epoxy equivalency of between 1.0 and 2.0, and a molecular weight of about 500 to 1000, and (2) 1% to 10% by weight of polyvinyl butyral.

References Cited in the file of this patent

UNITED STATES PATENTS

| 2,387,831 | Cogan et al. | Oct. 30, 1945 |
| 2,442,018 | Quarles | May 25, 1948 |
| 2,506,486 | Bender et al. | May 2, 1950 |
| 2,602,785 | Wiles et al. | July 8, 1952 |
| 2,626,223 | Sattler et al. | Jan. 20, 1953 |

FOREIGN PATENTS

| 574,459 | Great Britain | Jan. 7, 1945 |
| 597,144 | Great Britain | Jan. 19, 1948 |

OTHER REFERENCES

Bayes: Article in Paint, Oil and Chemical Review, November 20, 1952, pages 24 to 26.